United States Patent [19]

Schenk

[11] 4,113,300
[45] Sep. 12, 1978

[54] FILLER CONNECTION FOR VEHICLES DRIVEN BY INTERNAL COMBUSTION ENGINES

[75] Inventor: Bernd Schenk, Hamburg, Fed. Rep. of Germany

[73] Assignee: ITW-Ateco G.m.b.H., Norderstedt, Fed. Rep. of Germany

[21] Appl. No.: 741,187

[22] Filed: Nov. 12, 1976

[30] Foreign Application Priority Data

Nov. 29, 1975 [DE] Fed. Rep. of Germany ....... 2553881

[51] Int. Cl.² ............................................... B60J 9/00
[52] U.S. Cl. .................... 296/1 C; 137/859; 141/301; 141/392
[58] Field of Search ...................... 296/1 C; 137/85 G; 222/396; 141/301, 392

[56] References Cited

U.S. PATENT DOCUMENTS

| 2,319,567 | 5/1943 | Vegell | 141/392 |
|---|---|---|---|
| 3,027,915 | 4/1962 | Huffman | 137/85 G |
| 3,159,409 | 12/1964 | Koehler | 296/1 C |
| 3,827,456 | 8/1974 | Sheppard | 137/85 G |
| 3,872,900 | 3/1975 | Götz | 141/392 |
| 3,979,010 | 9/1976 | Fiedler | 141/392 |
| 4,008,738 | 2/1977 | Moskovich | 141/392 |

FOREIGN PATENT DOCUMENTS 2,545,443  4/1976  Fed. Rep. of Germany ......... 296/1 C Primary Examiner—Joseph F. Peters, Jr.
Assistant Examiner—John A. Carroll
Attorney, Agent, or Firm—Jack R. Halvorsen; Robert W. Beart

[57] ABSTRACT

The invention relates to a filler connection for vehicles driven by internal combustion engines which is fastened in an opening of the vehicle body and has a portion disposed on the inner surface of the body connected with a line leading to the fuel tank, while a portion on the outer surface is adapted to be closed by means of a lid, with valve means provided for overpressure relief and ventilation.

15 Claims, 6 Drawing Figures

FILLER CONNECTION FOR VEHICLES DRIVEN BY INTERNAL COMBUSTION ENGINES

BACKGROUND OF THE INVENTION

It is known to design the filler connection for a fuel tank in one piece with the filling tube; length and guidance of the filling pipe which normally consists of sheet metal being governed in this arrangement by the position of the fuel tank. Even though the construction of the one-piece filling tube does not cause so much difficulties problems, however, will arise in connection with the fitting thereof in the body. As there is no elastic intermediate member available, it is difficult to match the tolerances of tank and body. For the above reason the filler connections are normally manufactured as separate parts which are then soldered, welded or otherwise connected, for instance, through an elastic socket or with the aid of pipe clips or the like. But even these filler connections suffer from quite a few drawbacks. Because of the metallic material numerous re-working operations are necessary which brings about corresponding expenses in terms of manufacturing costs. Numerous additional elements are required for fastening to and sealing with respect to the body. Usually, the known filler connections are fastened at the body by means of several screws tightly pulling the filler connection against the sheet metal of the body.

To prevent corrosion the filler connections are covered with a corrosion protection means the layer of which may be easily damaged in the rough operation during the filling-in of the fuel so that corrosion will yet occur. What is furthermore disadvantageous is that it is difficult with a pipe construction of sheet metal to arrive at small structural dimensions because the overflow connection, in particular, must be designed in the form of a pipe bend and thus requires considerable space.

The "tank cover" which closes the filler connection outside is either designed in the manner of a bayonet closure (which is the most widely accepted embodiment) or is provided with an inner or outer thread and screwed onto the connection. With both types of closure, however, difficulties will result as regards the loosening moment. With a bayonet closure the possible forces of stripping off the cover are relatively small and, in addition, are strongly dependent upon the properties and the design of the material that has been selected. With a threaded closure the loosening moment of the cover is strongly dependent upon the tightening moment, especially, because of an axial sealing being used. For this reason, many threaded covers are provided with a special ratchet arrangement. Furthermore, it is difficult with a filler connection of sheet material to provide a greater threaded engagement for the closure lid so that here as well the pull-off forces are relatively low.

Additional provisions are required at the overall tank system to guarantee operation and safety in a satisfactory manner. This includes valve means for ventilation during fuel consumption and venting in case overpressure should occur, for instance, due to heating in the sun, etc. Furthermore, care must be taken for the air present in the tank to escape quickly enough during the filling-in of the liquid fuel. In many cases the valve means are provided in the closure lid which, consequently, is of an extremely expensive design. Another disadvantage of the closure lid performing valve functions resides in that fuel escaping through the venting valve will form traces over the outside of the body thus causing an increased danger of fire.

The invention has for its object to provide a filler connection for vehicles equipped with internal combustion engines which avoids the above mentioned disadvantages, is of a simple design and may be easily fitted, while being provided with a simply equipped closure lid through which no fuel may escape to the outside of the vehicle.

With a filling connection of the type mentioned at the beginning this problem is solved in that it is formed integrally of synthetic material and the valve means are arranged on the portion disposed on the inside of the body.

The filler connection according to the invention is a member of synthetic material formed in one piece which may be designed in such a manner that it is in a position to perform all the necessary functions satisfactorily. This includes the arrangement of the valve means at the filler connection so that the closure lid may correspondingly be manufactured as a member of a simple construction which is formed in one piece - in an embodiment not adapted to be closed. For this reason, the fuel is unable to escape outside and cannot mar the good appearance of the outer skin of the body and cause an increased danger of fire.

Through the formation of the filler connection in accordance with the invention as a member of synthetic material it is possible to obtain a favourable configuration also with a view to the fastening in a sheet metal member of the outer skin of the vehicle. In this connection provision is made in one embodiment of the invention for the filler connection to be in snapping engagement in the body opening and fastened therein. Therefore, there are no additional parts necessary to fasten the filler connection, and also the mounting itself is extremely simple because the filler connection has only to be introduced and snapped into the sheet metal opening. In this connection provision is made in another embodiment of the invention for the use of elastic synthetic material and for a radial abutment, preferably a flange formed integrally therewith, said flange lying close to one side of the body skin while at least one arresting nose is formed integrally on the other side of the body skin. If, in accordance with another embodiment of the invention, an annular seal is arranged between the abutment and the body skin, there will result not only an extremely simple and secure fastening but also a sufficient sealing of the connection in the opening, so that for instance when filling-in fuel no liquid whatsoever can flow past the filler connection and into the interior of the body.

The filler connection in accordance with the invention furthermore possesses the advantage that it may be equipped with a sufficiently strong and long thread which will permit fastening of the closure lid by threaded engagement. In this connection, provision is made in another embodiment of the invention for the outer portion to have a external thread formation, preferably a sawtooth thread formation onto which the lid can be screwed by means of a fitting inner thread, said lid being likewise preferably formed in one piece from synthetic material. With the aid of such a closure it is rendered possible for the loosening moment of the closure lid to be made approximately as great as the tightening moment, especially, if, in accordance with another embodiment of the invention, there is an axially and/or radially effective annular seal arranged at the thread of the lid, with the seal disposed at the inner surface of the thread of the lid and cooperating with the end face of the outer portion of the filler connection or arranged at the lower end of the thread of the filler connection and cooperating with the inside of the outer portion of the lid. The sealing element is preferably endowed with a relatively high elasticity of its own or dimensional elasticity, respectively, and is resistant to fuel.

To avoid an inadmissibly high torque and extremely high loads on the sealing caused thereby, provision is made in another embodiment of the invention for the lid to have a limiting abutment preferably in the form of a rib on the inside thereof, said abutment cooperating with a limiting abutment on the inside of the filler connection likewise shaped preferably in the form of a rib formed integrally therewith. In this arrangement, the inwardly disposed abutment rib may additionally be made use of as an undercut for the closing pin of a lock which may perhaps be provided in the lid. The volume of the filler connection in accordance with the invention disposed on either side of the sheet metal of the body preferably extends approximately horizontally with a downwardly bent pipe connection adjoining said region on the inside which is connected with the filling tube or hose to the tank. In accordance with another embodiment of the invention the pipe connection is provided with a radial projection in the region of the bend, preferably in the form of a flange. The radial projection limits the passage cross sectional area of the filler connection for tank guns. It is possible to vary the passage cross sectional area selectively by simply replacing the mold core in the production of the filler connection according to the invention, in order to thus adapt the passage cross sectional area to different tank guns.

Provision is made in another embodiment of the invention for the inner portion to have two parallel discharge connections integrally formed thereat, coaxially with the axis of the outer portion. The one discharge connection is connected with the fuel tank through a line or pipe in order to vent the latter when fuel is filled in. Any fuel entrained in this venting operation is subsequently returned into the filler connection and thus into the tank, immediately. The other discharge connection is connected with the venting valve through which in case of overpressure fuel vapours and thus also fuel entrained therewith, are discharged. A suitable conduit is connected to this discharge connection leading the exiting medium to the bottom of the vehicle.

Owing to the arrangement of the discharge connections as selected and, in addition, due to the bending-off of the farthest inwardly disposed part of the pipe connection it is possible with the invention to mount the connection from the outside of the body. As already explained above, the fastening is suitably effected by means of a snapping connection. With extremely thin sheet metal members it will perhaps become necessary to provide a clamping plate to accommodate the surface pressure from inside.

With the filler connection in accordance with the invention the valve means are associated to the filler connection proper, so that the closure lid may be of a simple construction and configuration. It is furthermore possible to use only one basic housing member both for the closable and the non-closable version. The parts of the lock are preferably mounted in the center portion of the lid, in recesses already provided for this purpose. In the process of production only one mold core has to be replaced in order to make possible the break-through for the lock. As regards the valves provision is made in one embodiment of the invention for two valves to be arranged preferably side by side in the upper region of the inner portion. In this connection, provision is made in another embodiment of the invention for the discharge connection for tank venting during filling to be disposed below the valves but above the pipe connection. It is particularly advantageous if the valves in accordance with the invention comprise two housing portions one of them formed integrally with the inner portion of the filler connection. The discharge connection for the overpressure valve in this arrangement is then suitably arranged at the other housing member.

If possible, the valves will be designed in such a manner that they are formed as far as possible in the formation of the connection proper. In this connection provision is made in another embodiment of the invention for the valves to be membrane valves having a membrane element provided with an opening and a valve seat element movable in limits, preferably a ball, which may be sealingly engaged with the opening. Such a valve makes use of the favourable properties of responsiveness of a membrane valve but avoids the disadvantage of too rapid wear and contamination by the provision of a valve seat element supported for limited movement which is adapted to be brought into sealing engagement with the sealing opening in the membrane element. The movability of the valve seat due to the movable valve seat element ensures a constant cleaning of the valve seat so that even with a contaminated medium the functional safety of the valve is not impaired. A support of the valve seat element for limited movement in addition offers the advantage that a displacement of the sealing opening from the center due to manufacturing tolerances or later influences may be accommodated and cannot have any disadvantageous effects on the sealing properties. The valve housing preferably consists of two members adapted to be connected with each other, with the membrane fastened and clamped form-closedly or positively between the two housing portions. One housing portion in this arrangement preferably is formed integrally with the filler connection while the other one is fastened thereat, for instance, by welding.

With the aid of such valves one obtains exact valve controls. The valves become responsive at extremely low pressures thus avoiding any overload of the tank in case of overpressure. As regards the design and fastening of the closure lid it will still be noted that when selecting an extremely great thread for the tank cover with a small depth of impression of the body the gripping trough for the lid may be fully recessed into the connection. This clearly reduces the danger of accidents.

BRIEF DESCRIPTION OF THE DRAWINGS

In the following, one example of embodiment of the invention will be described by way of the drawings, in which.

DESCRIPTION OF PREFERRED EMBODIMENT

Figure 1:
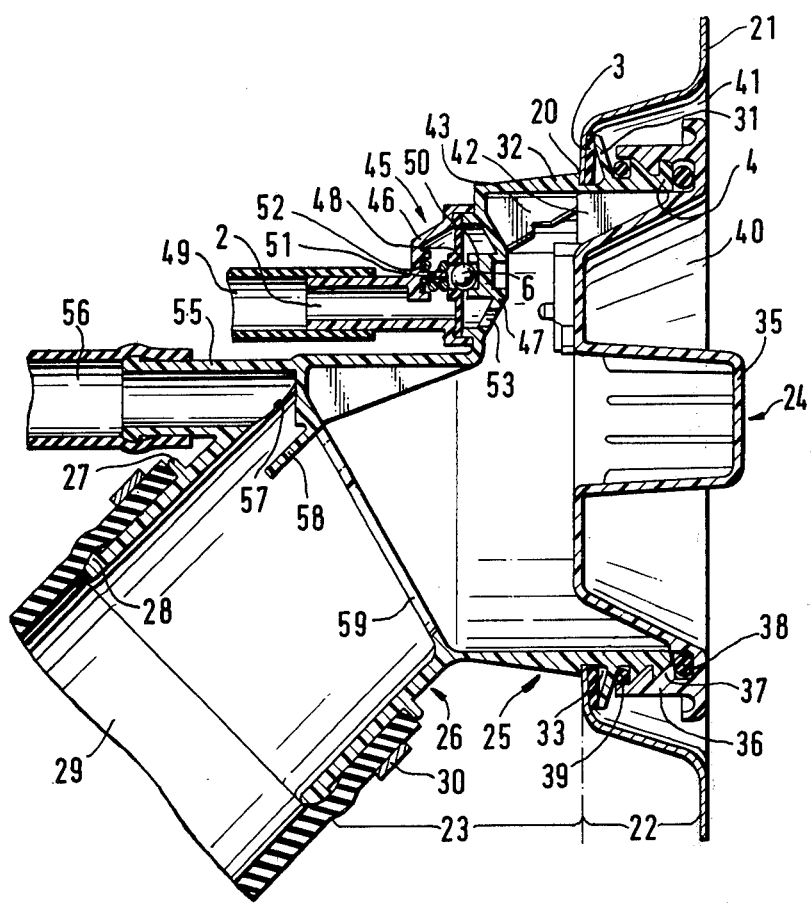
FIG. 1 shows an enlarged sectional view of the filler connection according to FIG. 3.

The filler connection is to be explained essentially by way of FIG. 1. A filler connection is fastened in an opening 20 of a sheet metal member 21, the outer skin of a body, for example. Consequently, the filling connection is subdivided into an outer portion 22 and an inner portion 23. A closure lid 24 is screwed onto the outer portion.

The outer and inner portions 22, 23 essentially consist of two tubular members 25, 26 including between them an obtuse angle, here 135°. The tubular portion 26 possesses a flangelike abutment 27 at the outside thereof and at the free end is provided with a circumferentially extending annular nose 28. The first mentioned member serves as an abutment for a hose 29 which is pushed onto the tubular member 26 and fastened thereat by means of a tube clip 30. The nose 28 is meant to prevent a sliding-off movement in an axial direction. The hose 29 of which only a portion is shown leads to a fuel tank, which is not shown.

The outer portion possesses a sawtooth outer thread 4 and a flange 31 in the form of a conically shaped ring of a relatively small thickness which due to the elastic property of the synthetic material develops a spring effect. The radial flange 31 is disposed in close contact with the outer surface of the sheet metal member 21 via a sealing 3, while from the other side there are four radially outwardly pointing resilient cams coming into close contact thus securing the filler connection in the opening 20. The filler connection is inserted into the opening 20 from outside with the edge of the opening sliding over the ramp-like cams or noses 32 which are in this operation slightly deformed radially inwardly, until it comes to snap into the recess 33 between the flange 31 and the shoulder 32a in rear of the cam 32.

The lid 24 is recessed inwardly in the center portion thereof with a gripping portion 35 in the center slightly projecting again outwardly above the outer plane of the lid 24. The lid 24 is in addition provided with an axial flange 36 having a sawtooth inner thread formed to match the thread 4 of the filler connection portion 22. In the last course of thread of the thread formation 37 there is an elastic annular seal 38 which comes to lie essentially axially against the end face of the portion 25 of the filler connection and the respectively adjacent portions of the lid 24, in order to prevent escape of fuel in a liquid or gaseous form. As an alternative to the above or as an addition thereto, an annular seal 39 is arranged in the first course of thread which cooperates with the flange 31 in order to develop here a sufficient sealing effect between the lid 24 and the filler connection. The sealing rings 38 and 39 have a high inherent elasticity and are resistant to fuel.

The threads 4 and 37 of the filler connection portion 22 and the lid 24 are provided with a relatively large diameter so that the gripping trough 40 of the lid 24 is fully countersunk or recessed into the filling connection which in its turn does not project above the surface of the sheet 21 which is likewise provided with an inwardly recessed trough 41 adjacent the opening 20.

The lid 24 has a rib 42 integrally formed on the inside thereof which cooperates with a rib 43 on the inside of the connection portion 25 as an abutment. In the embodiment shown the lid 24 is formed in one piece and without a lock. In case a lock is incorporated, the rib 43 may be provided as an undercut for the closing journal of the lock.

Figure 2:
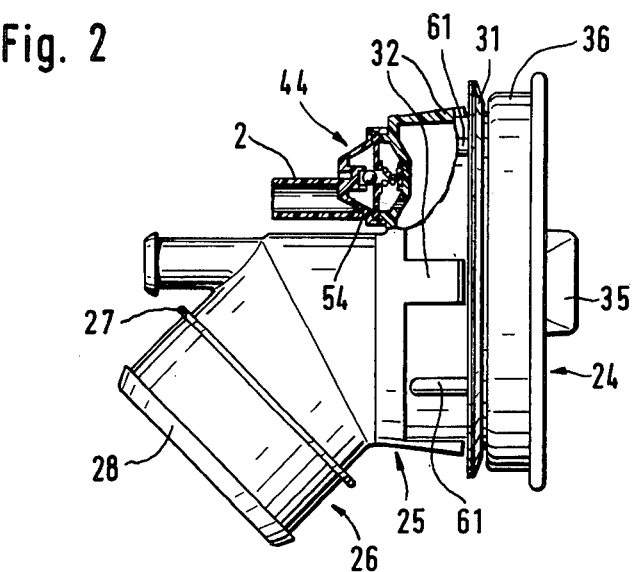
FIG. 2 shows a partly sectional side view of the filler connection according to the invention.
Figure 3:
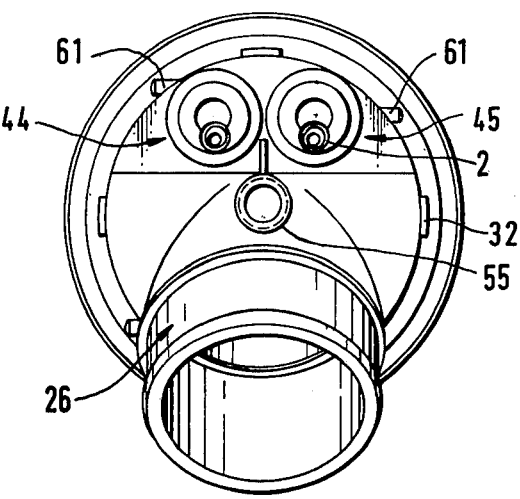
FIG. 3 shows a rear view of the filler connection according to FIG. 2.
Figure 4:
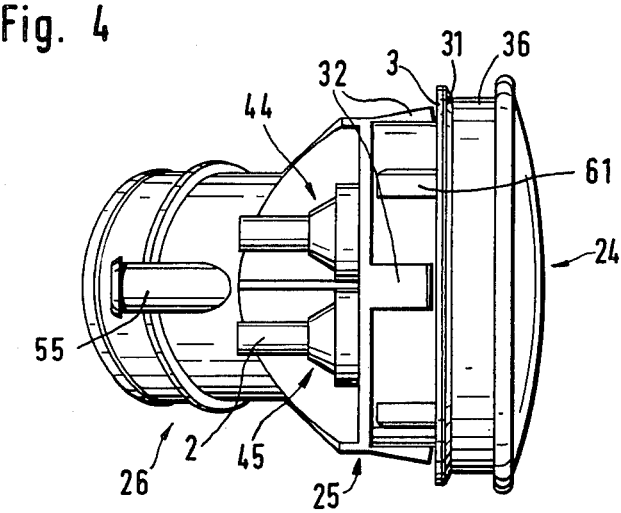
FIG. 4 shows a top plan view of the filler connection according to FIG. 3.
Figure 5:
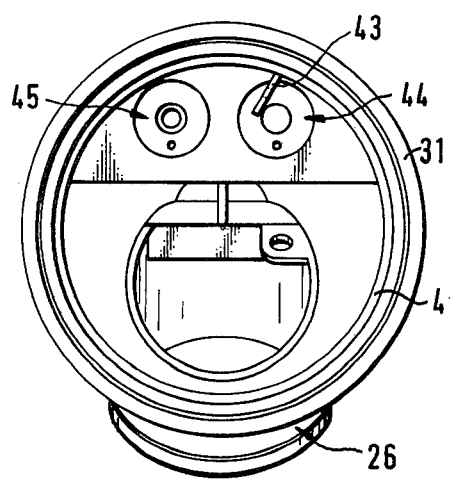
FIG. 5 shows a front view of the filler connection according to FIG. 3 with the cover removed.

In the upper region of the rear end face of the connection portion 25 there are provided two valves 44, 45. The valves 44, 45 are arranged side by side coaxially with respect to the axis of the portion 25 of the filler connection. Both valves 44, 45 are designed as membrane check valves, with the valve 44 functioning as a ventilation valve and the valve 45 as a venting valve. FIG. 1 only shows the venting valve 45 the construction of which will be described in more detail in the following. Valve 44, shown in FIG. 2, is constructed in the same manner but is arranged in an inverted sense because of the opposed function.

The valve housing consists of two halves 46, 47 of a circular outline and frustoconical cross sectional area which are interconnected by welding, for example, with overlapping flanges and clamping a membrane 48 between themselves. The housing portion 47 is formed integrally with the pipe connection while the housing portion 46 constitutes a separate shaped member having a discharge connection 2 formed integrally thereat. A hose 49 is pushed over the discharge connection 2 which leads to the lower region of the vehicle, which is not shown. The membrane 48 is provided with a central opening cooperating with a valve ball 6 which is retained to be movable in limits laterally and inwardly through a box-like recess 50. On the opposite side of the membrane 48 there is a pin 41 formed integrally with the housing 46 which limits the movement of the valve ball 6 in a direction towards the membrane opening. A coil spring 52 is arranged about the pin 51 which is supported at one end against the housing member 46 and at the other end against the membrane 48. If there is an overpressure prevailing in the fuel tank and thus in the filler connection, the medium (in this case fuel vapour and liquid fuel too) may enter through an opening 53 in the valve housing portion 47 into the right-hand valve chamber and may flow into the left-hand chamber via the opening of the membrane through the deflection thereof, and thence into the discharge connection 2. The hold-down pin 51 prevents the valve ball 6 from following the deflection of the membrane 48. The valve arrangement shown becomes responsive at lowest overpressures so that dangerous overpresssures will at any rate be avoided.

As already mentioned above the valve 44 is fitted with its sides disposed vice versa and thus makes possible ventilation of the filler connection and thus of the tank when fuel is being withdrawn with the internal combustion engine running. A discharge connection would of course not be necessary here. But it is suitably provided here as well in order to avoid easy contamination of the inlet opening 54 in the outer valve housing portion. Furthermore, it is possible here as well to convert the valve half 46 of the valve 44 into the valve half 46 of the valve by replacement of a core. FIG. 2 shows a cross sectional view of the ventilation valve 44.

Slightly above the axis of the connection member 25 there is a discharge connection 55 formed integrally therewith over which a hose line 56 is pushed leading to the fuel tank (not shown) i.e. into the interior of said tank at the uppermost point thereof, in order to guarantee venting during filling. The air and fuel entrained with it re-enter the connection portion 26 through the connection 55 and an opening 57 with a wall 58 extending normal to the axis of the connection portion 25 in the upper part and in parallel with the axis of the connection portion 26 in the lower part taking care of deflection in the direction of the axis of the connection portion 26, so that any splashing from the filler connection is avoided.

The coaxial but offset arrangement of the discharge connections 2 and 55 as well as the bend of the connection portion 26 make possible an extremely space-saving arrangement of the entire connection and insertion thereof from outside during mounting.

A flange-like radial projection 59 in the bent-off region between the connection portions 25 and 26 may selectively be provided determining the cross sectional area for the tank gun (not shown). Tank guns having a diameter exceeding that of the opening formed by the flange 59, therefore, cannot be used for filling the fuel tank.

Figure 6:
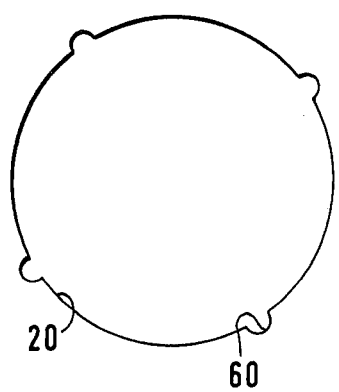
FIG. 6 shows a representation of the opening in a sheet metal member for fastening the filler connection.

FIG. 6 shows a representation of the configuration of the opening 20 formed in the sheet metal member 21. It is of an essentially circular configuration but provided with four circular recesses 60 in uniformly spaced circumferential arrangement cooperating with positioning projections 61 on the outer surface of the connection thus securing the connection against rotation.

I claim:

1. A one-piece compact plastic fuel filler connection assembly for vehicles driven by internal combustion engines, said connection adapted to be fastened in a non-circular opening (20) in a vehicle body and connected with a conduit (29) leading to a fuel tank of the vehicle, said connection including a first annular portion (25) and an obtuse angularly disposed second annular portion (26) with said first annular portion including an outer section (22) extending through said opening (20) in an outer panel (21) of said body, integral means (32) for quick fastening said outer section (22) to said outer panel (21) in substantially non-rotative sealed relationship, said outer section further including means (4) for accepting a lid (24) in sealed relationship, a pair of membrane one-way check valves (44,45) communicating with an inner section (23) of said first annular portion (25) and said fuel tank and providing overpressure venting and vacuum relief to said tank, said valves (44,45) adapted to be positioned behind said outer panel (21) and non-valved venting means (55) communicating with said connection and said fuel tank for venting during filling.

2. Filler connection assembly according to claim 1, wherein said fastening and sealing means includes an integrally formed resilient radial abutment (31) adapted to engage closely against one side of the outer panel (21) and at least one arresting nose (32) formed integrally on the other side of the outer panel (21).

3. Filler connection assembly according to claim 2, characterized in that there is an annular seal (33) arranged between the abutment (31) and the other panel (21).

4. Filler connection assembly according to claim 1, wherein the outer section (22) includes an outer thread (4), preferably a sawtooth thread, onto which the lid (24) is adapted to be screwed by means of a suitable inner thread, said lid being likewise formed preferably integrally from synthetic material.

5. Filler connection assembly according to claim 4, wherein there is an annular seal (38,39) arranged at the thread (37).

6. Filler connection assembly according to claim 5, wherein the seal (38) is disposed at the inner surface of the thread (37) of the lid cooperating with the free end surface of the outer section (22) of the connection.

7. Filler connection assembly according to claim 6, wherein the seal (39) is disposed beneath the thread (4) of the connection cooperating with the outer lid (24) inner surface.

8. Filler connection assembly according to claim 1, wherein the lid (24) includes a first limiting abutment (42) in the form of a rib which cooperates with a second limiting abutment (43) positioned on the inner surface of the connection designed as an integral rib.

9. Filler connection assembly according to claim 1, wherein the said second annular portion (26) is provided with an internal radial projection in the form of a flange, in the region of the angular junction.

10. Filler connection assembly according to claim 1, wherein there are two discharge connections (2,55) formed integrally with the inner section (23) of first annular portion (25) extending in parallel with each other and parallel with the axis of the outer section (22) of the first annular portion (25).

11. Filler connection assembly according to claim 1, wherein said two valves (44,45) are arranged in an upper region of the inner section (23), preferably side by side.

12. Filler connection assembly according to claim 11, wherein the connection (55) for tank venting during filling is arranged below the valve (44,45) but above the second annular portion (26).

13. Filler connection assembly according to claim 11, wherein the valves (44,45) comprise two housing portions (46,47) one (47) of which being formed integrally with the inner section (23) of the first annular portion (25) of the connection.

14. Filler connection assembly according to claim 13, wherein the discharge connection (2) for the overpressure valve (45) is formed integrally with the other housing portion (46).

15. Filler connection assembly according to claim 14, wherein the valves (44,45) are membrane valves comprising a membrane element (48) provided with a central opening and a valve seat element (6), preferably a ball, a spring and a co-axial rigid rod traversing said spring and the membrane opening to limit the movement of said ball, and means for laterally restraining said ball so that said ball is only capable of limited movement and adapted to be brought into sliding engagement with the opening.

* * * * *